(12) United States Patent
Lakshmanan

(10) Patent No.: US 11,605,008 B2
(45) Date of Patent: Mar. 14, 2023

(54) COGNITIVE RULE GENERATION BASED ON DATA ANALYTICS

(71) Applicant: INTERNATIONAL BUSINESS MACHINES CORPORATION, Armonk, NY (US)

(72) Inventor: Sriram Lakshmanan, Shrewsbury, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1203 days.

(21) Appl. No.: 16/145,454

(22) Filed: Sep. 28, 2018

(65) Prior Publication Data
US 2020/0104728 A1  Apr. 2, 2020

(51) Int. Cl.
*G06F 40/40* (2020.01)
*G06N 5/025* (2023.01)
*G06Q 10/109* (2023.01)
*G06Q 10/107* (2023.01)

(52) U.S. Cl.
CPC ............ *G06N 5/025* (2013.01); *G06F 40/40* (2020.01); *G06Q 10/107* (2013.01); *G06Q 10/109* (2013.01)

(58) Field of Classification Search
USPC ............................................ 709/206; 706/47
See application file for complete search history.

(56) References Cited

U.S. PATENT DOCUMENTS

| | | | | |
|---|---|---|---|---|
| 8,346,875 B2* | 1/2013 | Gillai | ...................... | G06F 15/16 709/206 |
| 8,595,125 B2* | 11/2013 | Reich | ...................... | G06Q 30/02 705/37 |
| 8,667,069 B1 | 3/2014 | Connelly et al. | | |
| 9,596,196 B1* | 3/2017 | Hills | ...................... | H04L 51/00 |
| 9,753,896 B2* | 9/2017 | Bier | ...................... | H04W 4/021 |
| 9,954,810 B2* | 4/2018 | Osipkov | ............... | H04L 67/306 |
| 2003/0046421 A1* | 3/2003 | Horvitz | ................... | H04L 51/00 709/206 |
| 2011/0208822 A1* | 8/2011 | Rathod | ................. | G06Q 30/02 709/206 |
| 2012/0158638 A1* | 6/2012 | Churchill | ............... | G06Q 10/00 706/54 |
| 2014/0058801 A1 | 2/2014 | Deodhar et al. | | |

(Continued)

OTHER PUBLICATIONS

Microsoft Office 365, "Transform your organization with Microsoft Workplace Analytics", Microsoft, Jul. 5, 2017, 3 pages.

*Primary Examiner* — Anthony Mejia
(74) *Attorney, Agent, or Firm* — Monchai Chuaychoo; Andrew D. Wright; Calderon Safran & Cole P.C.

(57) ABSTRACT

A computer-implemented method includes: determining, by a computer device, classifications of plural messages sent amongst plural users; detecting, by the computer device, actions performed by users in response to receiving ones of the plural messages; determining, by the computer device, insights based on the determined classifications and the detected actions; automatically generating, by the computer device, at least one new rule based on at least one of the insights; and automatically applying, by the computer device, the at least one new rule to new messages sent amongst the plural users.

20 Claims, 5 Drawing Sheets

(56) References Cited

U.S. PATENT DOCUMENTS

| | | | |
|---|---|---|---|
| 2014/0129942 A1* | 5/2014 | Rathod | H04N 21/44226 715/720 |
| 2014/0280616 A1 | 9/2014 | Ramanathan et al. | |
| 2014/0351257 A1* | 11/2014 | Zuzik | H04L 67/10 707/740 |
| 2015/0006651 A1* | 1/2015 | Chmara | H04L 51/216 709/206 |
| 2015/0039705 A1* | 2/2015 | Kursun | H04L 51/234 709/206 |
| 2015/0081816 A1* | 3/2015 | Trevelyan | G06Q 10/109 709/206 |
| 2015/0188870 A1* | 7/2015 | Sharp | H04L 51/42 715/752 |
| 2015/0195233 A1* | 7/2015 | Ramanathan | H04L 51/42 709/207 |
| 2015/0281156 A1* | 10/2015 | Beausoleil | H04L 51/212 709/206 |
| 2015/0381533 A1* | 12/2015 | Klemm | H04L 51/02 709/206 |
| 2016/0041812 A1* | 2/2016 | Kaiser | G06F 7/08 707/752 |
| 2016/0147782 A1* | 5/2016 | Roseman | G06F 16/16 707/822 |
| 2016/0255139 A1* | 9/2016 | Rathod | H04N 1/32101 709/203 |
| 2017/0124034 A1* | 5/2017 | Upadhyay | G06F 40/289 |
| 2017/0357394 A1* | 12/2017 | Jon | G06F 3/0481 |
| 2019/0044975 A1* | 2/2019 | Schafer | G06Q 10/107 |

* cited by examiner they support distinct, objectively identifiable machine learning tasks [1]. Because they are complementary, both can be explored within the same system.

COGNITIVE RULE GENERATION BASED ON DATA ANALYTICS

BACKGROUND

The present invention relates generally to electronic messaging systems and, more particularly, to a cognitive enabled message analytics system.

In today's world, email is still the primary mode of communication in the work place environment. For example, an enterprise (e.g., a company) with 1000-1500 employees might typically handle 1 million emails each day. These 1 million emails are manually parsed and categorized by individuals based on their respective preferences.

There are automated systems to parse email messages and put them in different folders based on specified rules. One such system provides the ability to define custom rules to decide possible actions based on metadata and/or content of an email message. Another such system has the ability to interpret an email and categorize it as spam, junk, etc.

SUMMARY

In a first aspect of the invention, there is a computer-implemented method including: determining, by a computer device, classifications of plural messages sent amongst plural users; detecting, by the computer device, actions performed by users in response to receiving ones of the plural messages; determining, by the computer device, insights based on the determined classifications and the detected actions; automatically generating, by the computer device, at least one new rule based on at least one of the insights; and automatically applying, by the computer device, the at least one new rule to new messages sent amongst the plural users.

In another aspect of the invention, there is a computer program product including a computer readable storage medium having program instructions embodied therewith. The program instructions are executable by a mail server to cause the mail server to: determine classifications of plural email messages sent amongst plural users; detect actions performed by users in response to receiving ones of the plural email messages; determine insights based on the determined classifications and the detected actions; automatically generate at least one new rule based on at least one of the insights; and automatically apply the at least one new rule to new email messages sent amongst the plural users.

In another aspect of the invention, there is system including: a messaging server comprising a processor, a computer readable memory, and a computer readable storage medium; program instructions to determine classifications of plural messages sent amongst plural users; program instructions to detect actions performed by users in response to receiving ones of the plural messages; program instructions to determine insights based on the determined classifications and the detected actions; program instructions to automatically generate at least one new rule based on at least one of the insights; and program instructions to automatically apply the at least one new rule to new messages sent amongst the plural users. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
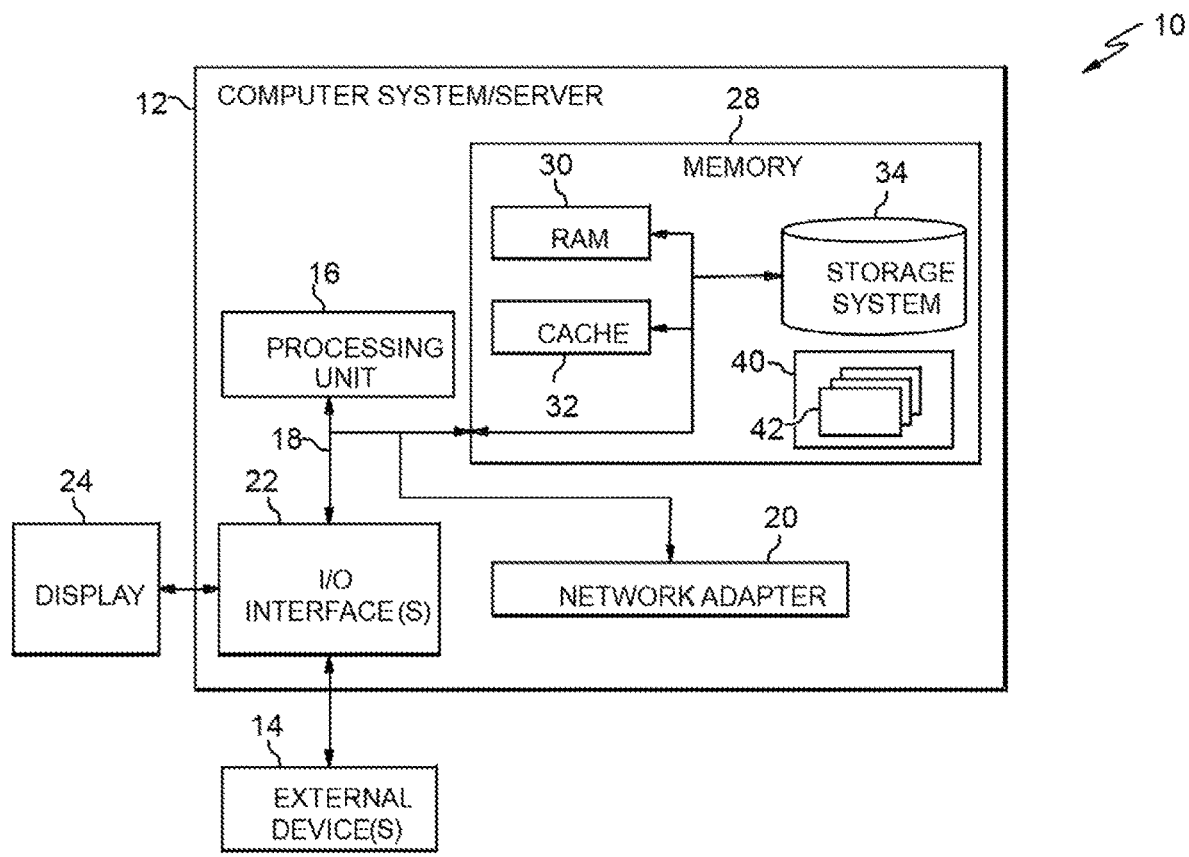
FIG. 1 depicts a computer infrastructure according to an embodiment of the present invention.

The present invention relates generally to electronic messaging systems and, more particularly, to a cognitive enabled message analytics system. According to aspects of the invention, a system cognitively analyzes emails sent within a group of users, monitors actions taken by recipients of the emails, generates rules based on the cognitive analysis and actions taken, and then applies the rules to individual emails that are subsequently sent within the group. Aspects of the invention include: performing big data analytics on multiple email messages across an enterprise to determine insights; automatically generating rules based on the determined insights; and providing personal assistant features in email applications based on the rules. In this manner, implementations of the invention improve efficiency of email systems by automatically generating rules for handling emails within an enterprise.

A key challenge in the corporate world is the amount of time spent by employees managing their incoming messages (e.g., emails) and deciding whether a particular message initiates any action to perform or whether it is just an informational note that requires no further action. If the message requires an action (e.g., "please send the weekly report by Friday") then the recipient has to manually track this item from inception to closure, including managing the reminders. For example, email messages may include unstructured text that signifies an action item, such as "please ensure the weekly report is sent by this Friday" or "Can I get an update on this item by tomorrow" or "Please submit the timesheet by Tuesday." In current email systems, the recipient manually parses this text and decides what action to take in response to the email. The manual process is time consuming and error prone. This results in multiple reminders to the user to complete the task, resulting in wastage of hundreds of work hours. In some situations, deadlines are sometimes missed because there simply are too many emails to read and take action on.

Implementations of the invention reduce the amount of manual work performed by email recipients by using cognitive technology to automatically make decisions about how to handle email messages. According to aspects of the invention, incoming email messages are parsed by a cognitive powered system to classify them as either informational mails (e.g., that require no action) or action-oriented mails that require action from the recipient of the email. For example, if an email message indicates that the status report is due by Friday, then the system automatically creates a task alert to assist the recipient. This cognitive based system helps take the productivity of the organization to next level by reducing manual reminders, follow-ups, and missed deadlines for tasks.

Aspects of the invention provide a technical solution to the technical problem of email-related lost productivity. In embodiments, the technical solution includes a cognitive based automatic task creation and alert system for handling emails. Aspects of the invention provide an improvement to the technical field of email messaging by automatically generating new rules based on cognitive analysis of emails within a group of people, and by subsequently applying the new rules to emails sent within the group.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
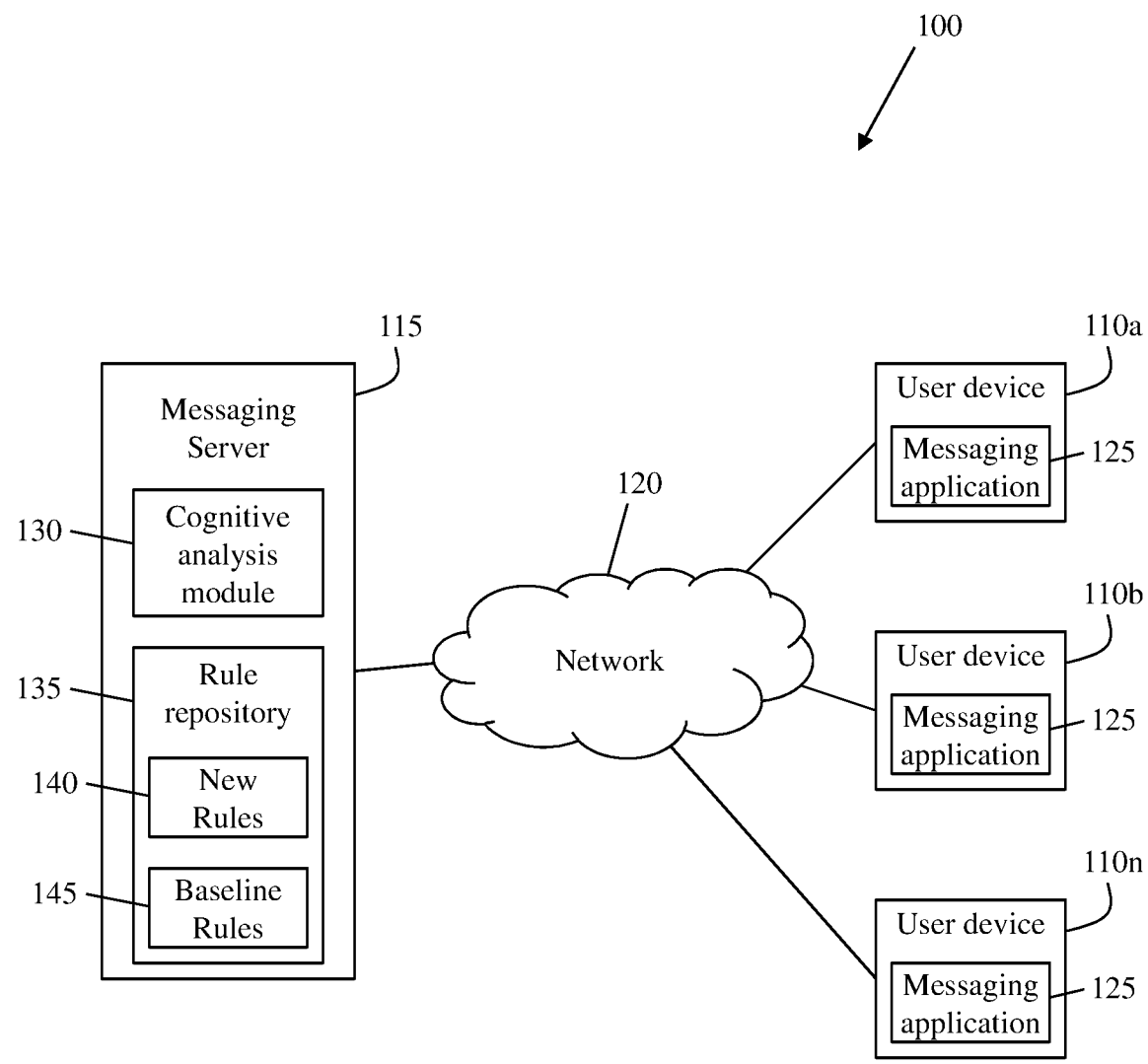
FIG. 2 shows a block diagram of an exemplary environment in accordance with aspects of the invention.

FIG. 2 shows a block diagram of an exemplary environment 100 in accordance with aspects of the invention. In embodiments, the environment 100 includes plural user devices 110a-n connected to a messaging server 115 via a network 120, where "n" represents the number of user devices in a group such as an enterprise, organization, or company. In embodiments, the network 120 comprises any suitable communication network or combination of networks, such as a local area network (LAN), a general wide area network (WAN), and/or a public network (e.g., the Internet).

Each user device 110a-n is a computer device such as a desktop computer, laptop computer, tablet computer, or smartphone, and may include one or more elements of the computer system 12 of FIG. 1. In embodiments, each user device 110a-n includes a messaging application 125, such as an email client application, that is configured to permit users of the user devices 110a-n to send electronic messages to one another via the messaging server 115 and the network 120. In embodiments, the messaging application 125 causes a messaging user interface to be displayed by the user device, and a user may view, manage, send, and receive emails via the user interface. In a particular embodiment, the messaging application 125 is an email client application and the user interface is an email user interface that includes different folders into which individual email messages may be sorted by the user. Aspects of the invention are described herein with respect to email messaging; however, other types of messaging applications may be used with implementations of the invention, including slack communications, forums, communities, etc.

Still referring to FIG. 2, the messaging server 115 is a computer device that is configured to handle and deliver messages between the user devices 110a-n via the network 120. In embodiments, the messaging server 115 is a mail server and includes one or more elements of the computer system 12 of FIG. 1. In embodiments, the messaging server 115 includes one or more modules (e.g., program module 42 of FIG. 1) that are executed by the messaging server 115 and that are configured to perform one or more of the functions described herein in addition to traditional message handling functions that are performed by the messaging server 115. The messaging server 115 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment 100 is not limited to what is shown in FIG. 2. In practice, the environment 100 may include additional devices and/or networks; fewer devices and/or networks; different devices and/or networks; or differently arranged devices and/or networks than illustrated in FIG. 2.

According to aspects of the invention, the messaging server 115 includes a cognitive analysis module 130 that is configured to analyze messages that are sent and/or received via the messaging application 125. In embodiments, the module 130 classifies each message using cognitive analysis techniques such as natural language understanding, unstructured data analysis, and structured data analysis. Classifications may be based on words and/or phrases included in the email, cognitively determined topic of the email, cognitively determined sentiment of the email, cognitively determined tone of the email, sender of the email, recipient(s) of the email, relative rank of users within a hierarchy of the group, and other parameters that are derived using cognitive analysis techniques.

In accordance with aspects of the invention, the module 130 also monitors actions that users perform in response to receiving email messages via the messaging application 125. In embodiments, the module 130 communicates with or obtains data from the messaging applications 125 on the user devices 110a-n to determine what actions a user performs in response to receiving a particular email message. Actions that the module 130 monitors may include, but are not limited to: forwarding an email to another user; replying to a sender of an email; replying to all recipients and the sender of an email; opening a link in an email; saving an email in a file directory; moving an email to another folder; creating a meeting invite that includes information from an email; creating a reminder that includes information from an email; creating a task that includes information from an email; deleting an email; and not opening an email.

In embodiments, in addition to monitoring the types of actions that a user performs in response to receiving an email, the module 130 is also configured to detect an amount of time that elapses between when the user first receives (or first opens) the particular email and when the user performs an action. For example, the module 130 may be configured to detect that a user who receives an email deletes the email "x" number of second after first opening the email. As another example, the module 130 may be configured to detect that a user who receives an email sends a "reply to all" email "y" number of second after first opening the email.

According to aspects of the invention, the module 130 is configured to determine insights about how different types of emails are handled within the group based on the determined classifications of the emails and the actions (and optionally the timing of the actions) that are performed in response to the emails. In embodiments, the module 130 determines classifications and detects user actions (both as described previously) for all the emails that are sent via the message applications 125 of the user devices 110a-n, and cognitively analyzes the determined classifications and detected actions to determine insights about how emails are handled within this particular group of users. In embodiments, the module 130 determines the insights using cognitive analysis techniques such as natural language understanding, unstructured data analysis, and structured data analysis. The determined insights may indicate that include but are not limited to concepts such as: "action needed," "no action needed," "response needed," "no response needed," and "follow up required."

Exemplary use cases are provided below to illustrate how insights are derived by the module 130. The use cases and insights described herein are merely examples and are not intended to limit implementations of the invention. In a first exemplary use case, the module 130 determines that for all emails of classification "A" (where "A" represents a classification determined by the module 130), 95% of the recipients delete these emails after opening them without performing any other action. Based on this, the module 130 determines an insight that emails of classification "A" are informational only and do not require any follow-on action by the recipient.

In another exemplary use case, the module 130 determines that for all emails of classification "B" (where "B" represents another classification determined by the module 130), 83% of the recipients of these emails send a response email to the sender within 1 hour of first opening the email. Based on this, the module 130 determines an insight that emails of classification "B" require the follow-on action of responding to the sender within 1 hour of first reading the email.

In another exemplary use case, the module 130 determines that for all emails of classification "C" (where "C" represents another classification determined by the module 130), 99% of the recipients of these emails send a subsequent email to a particular email address (e.g., human.resources@example.domain.com) within 1 day of the send date of the email of classification "C," and further that the subsequent email includes an attachment of a particular file type (e.g., a spreadsheet document tilted "TimeSheet"). Based on this, the module 130 determines an insight that emails of classification "C" require the follow-on action of emailing a spreadsheet document tilted "TimeSheet" to human.resources@example.domain.com within 1 day of the send date of the email of classification "C."

In another exemplary use case, the module 130 determines that all emails of classification "D" are sent to an email group ID, and that the emails of classification "D" are undeliverable to (e.g., being 'bounced back from') one of the email addresses included in the email group ID. Based on this, the module 130 determines the email group ID should be revised to omit the undeliverable one of the email addresses. In this example, classification "D" represents a classification determined by the module 130.

In another exemplary use case, the module 130 determines that all emails of classification "E" are sent to an email group ID, and that a recipient (e.g., User1) of these emails nearly always (e.g., 95% of the time) forwards these emails to plural other users (e.g., User2 and User3). Based on this, the module 130 determines that User2 and User3 should be added to an email group ID for emails of classification "E." In this example, classification "E" represents a classification determined by the module 130.

In another exemplary use case, the module 130 determines that all emails of classification "F" are sent to an email group ID, and that a recipient (e.g., User1) of these emails has an automatic rule set up (e.g., in the messaging application 125) to forward the email to another user (e.g., User2) and then delete the email after forwarding. Based on this, the module 130 determines that User1 should be omitted from the email group ID of emails of classification "F" and that User2 should be added to this email group ID. In this example, classification "F" represents a classification determined by the module 130.

In another exemplary use case, the module 130 determines that all emails of classification "G" are sent to an email group ID, and that a recipient (e.g., User1) of these emails nearly always (e.g., 95% of the time) leaves these emails unread in their inbox. Based on this, the module 130 determines that User1 should be deleted from the email group ID for emails of classification "G." In this example, classification "G" represents a classification determined by the module 130.

Still referring to the messaging server 115 of FIG. 2, according to aspects of the invention the module 130 generates new rules based on the determined insights, and applies the new rules to new messages that are subsequently sent and/or received by the messaging application 125 of one or more of the user devices 110*a-n*. In embodiments, a new rule comprises one or more of: a rule to automatically move a received email to a particular folder in the recipient's email user interface; and a rule to automatically create a reminder about a received email in the user interface. A new rule may alternatively comprise a rule to automatically generate and present a recommendation to a sender of an email to suggest that the sender modify something about the email. In embodiments, the module determines which new rule to apply to a new message based on determining a classification of the new message and comparing the determined classification of the new message to classifications associated with the new rules.

An illustrative example of a new rule that is generated by the module 130 is that for new messages that are determined to be classification "B," the module 130 generates a reminder that automatically appears 1 hour later in the user interface of a recipient of the new message and that includes text that reminds the recipient to respond to the sender of the new message. Another illustrative example of a new rule that is generated by the module 130 is that for new messages that are determined to be classification "C," the module 130 automatically moves the new message to a folder named "HR Timesheet—action needed" in the user interface of a recipient of the new message. Another illustrative example of a new rule that is generated by the module 130 is that for new messages that are determined to be classification "G," the module 130 automatically generates and displays a notification to the sender of the new message suggesting that a particular user be deleted from the email group ID to which the new message is sent.

In embodiments, the messaging server 115 stores the new rules in a rule repository 135, which may comprise a program module and/or data storage component of the messaging server 115. In accordance with aspects of the invention, the rule repository 135 stores new rules 140 generated by the module 130 and baseline rules 145 that are predefined in the system. By storing and applying both baseline rules and new rules, implementations of the invention leverage a combination of baseline knowledge that is predefined by one or more users of the system and acquired knowledge that is learned by analyzing how users act when using the system. Baseline rules may include rules that automatically move a received email to a particular folder based on a predefined condition being satisfied. For example, a baseline rule may comprise a rule defined by a User1 (e.g., via the user interface of the messaging application 125 of the user device 110*a*) that all messages from User2 are automatically moved to a folder named "Follow Up with User2." Another example of a baseline rule is a rule defined by an administrator of the messaging server 115 that all emails from User3 are flagged with a flag icon that appears beside the email in the user interface of the recipient. These are mere examples of baseline rules, and other baseline rules may be stored in the rule repository 135 in implementations of the invention.

Figure 3:
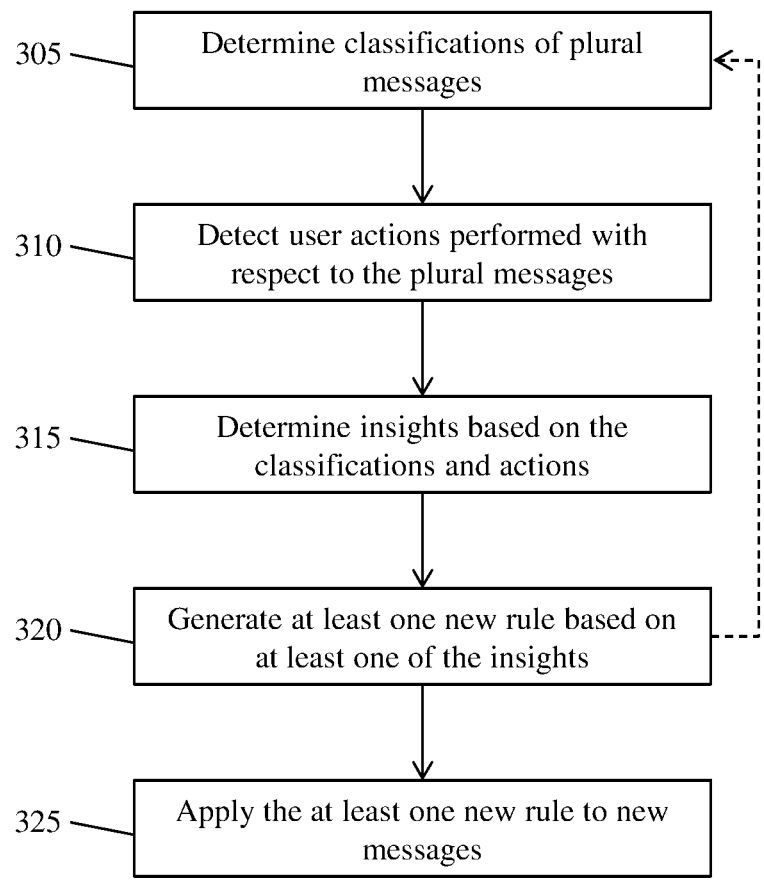
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system determines classifications of plural messages. In embodiments, and as described with respect to FIG. 2, the module 130 of messaging server 115 classifies messages (e.g., email messages) sent amongst users of a group, the classification being performed using cognitive analysis techniques. Such classifications may be based on at least one of: words and/or phrases included in the email, cognitively determined topic of the email, cognitively determined sentiment of the email, cognitively determined tone of the email, sender of the email, recipient(s) of the email, relative rank of users within a hierarchy of the group.

At step 310, the system detects user actions performed with respect to the plural messages from step 305. In embodiments, and as described with respect to FIG. 2, the module 130 monitors data from the system to detect actions a user performs in response to receiving a particular message. Such actions may include but are not limited to: forwarding an email to another user; replying to a sender of an email; replying to all recipients and the sender of an email; opening a link in an email; saving an email in a file directory; moving an email to another folder; creating a meeting invite that includes information from an email; creating a reminder that includes information from an email; creating a task that includes information from an email; deleting an email; and not opening an email.

At step 315, the system determines insights based on the determined classifications (from step 305) and the detected actions (from step 310). In embodiments, and as described with respect to FIG. 2, the module 130 cognitively analyzes the determined classifications and detected actions to determine insights about how emails are handled within this particular group of users.

At step 320, the system generates at least one new rule based on at least one of the insights. In embodiments, and as described with respect to FIG. 2, the module 130 generates a new rule based on the insights, wherein the new rule comprises a rule to automatically move a received email to a particular folder in the recipient's email user interface and/or a rule to automatically create a reminder about a received email in the user interface. The new rule may alternatively comprise a rule to automatically generate and present a recommendation to a sender of an email to suggest that the sender modify something about the email. Step 320 may comprise storing the at least one new rule in a rule repository 135 with at least one predefined baseline rule.

At step 325, the system applies the at least one new rule (from step 320) to new messages. In embodiments, and as described with respect to FIG. 2, when a user in the group sends a new message, the module 130 classifies the new message in a manner similar to that described with respect to step 305. In embodiments, the module 130 accesses the rule repository 135 and determines that the at least one new rule applies to the determined classification of the new message. Based on determining that the at least one new rule applies to the determined classification of the new message, the module 130 automatically applies the at least one new rule to the new message.

In a first example of step 325, the module 130 determines the classification of the new message is classification "B" and, based on this, generates a reminder that automatically appears in the user interface of a recipient of the new message, wherein the reminder includes text that reminds the recipient to respond to the sender of the new message within a certain time (e.g., by 3:00 PM today).

In a second example of step 325, the module 130 determines the classification of the new message is classification "C" and, based on this, automatically moves the new message to a folder named "HR Timesheet—action needed" in the user interface of a recipient of the new message.

In a third example of step 325, the module 130 determines the classification of the new message is classification "G" and, based on this, automatically generates and displays a notification to the sender of the new message suggesting that a particular user be deleted from the email group ID to which the new message is sent.

In accordance with aspects of the invention, steps 305-320 are performed on all or substantially messages within a group of users to develop a corpus of information (e.g., determined classifications and detected actions) from which insights are determined and based on which new rules are generated. In embodiments, the corpus of information is continuously updated by performing at least steps 305 and 310 for each new email that is sent within the group. In this manner, steps 315 and 320 may be performed at predefined intervals as the corpus of information is continuously updated.

In accordance with further aspects of the invention, the new rules that are generated by the system are automatically applied, when applicable, to all messages received by users in the group (e.g., users of user devices 110*a-n*). In this manner, the actions of the users in the group are crowd-sourced in determining the insights and generating the new rules that are applied to everyone in the group to thereby increase the efficiency of the users of the group.

Figure 4:
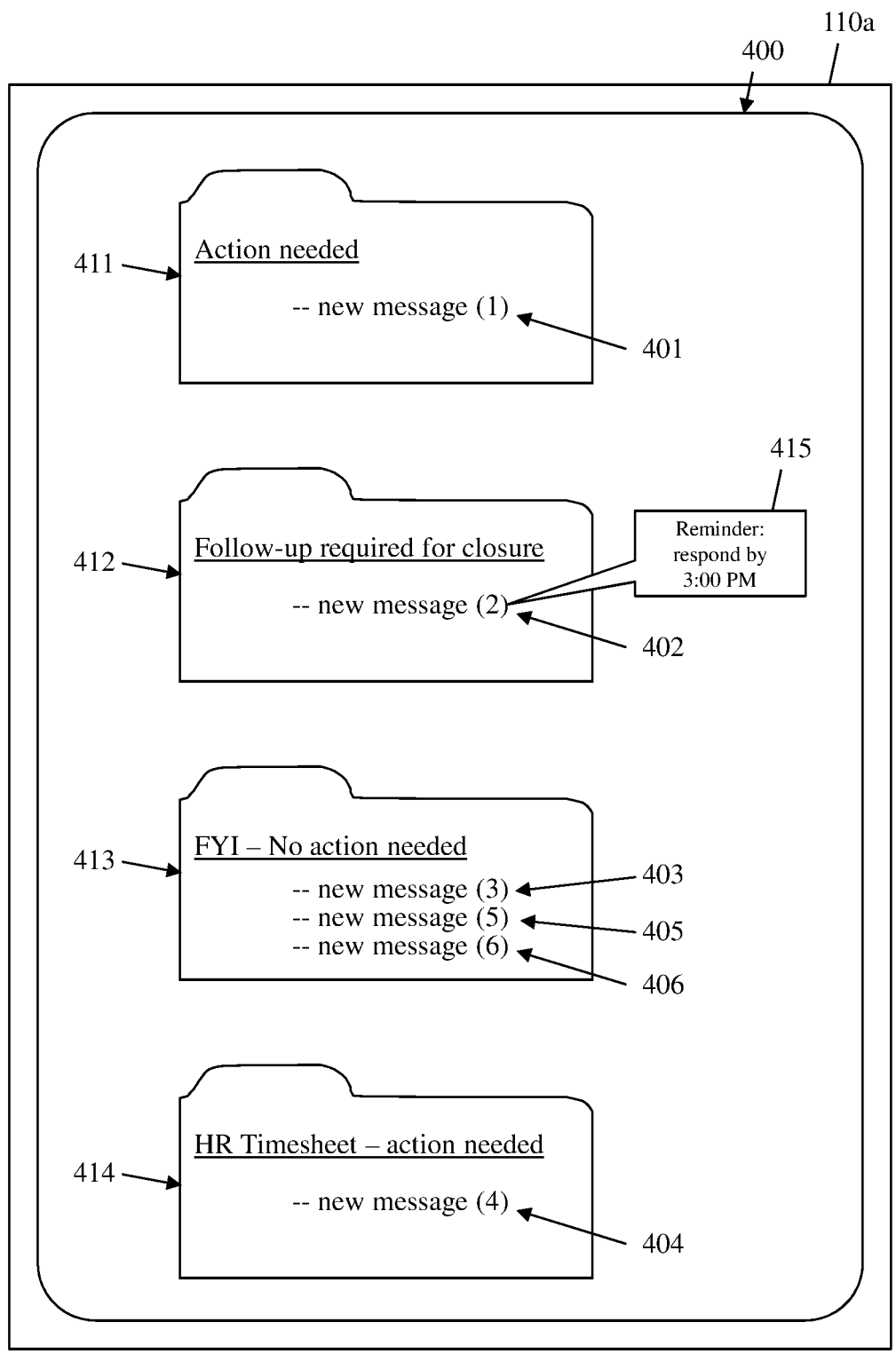
FIG. 4 shows an exemplary user interface in accordance with aspects of the invention.

FIG. 4 shows an exemplary implementation of aspects of the invention. In particular, FIG. 4 shows a user interface 400 of the messaging application of a user device (e.g., user device 110*a*) of FIG. 2. In the example shown in FIG. 4, the module 130 automatically organizes a number of new messages 401-406 by moving respective ones of the messages into different folders 411-414 (e.g., buckets) by classifying the new messages and then applying cognitively determined rules to the new messages 401-406 based on the determined classification of each message, as described herein. FIG. 4 also shows an example of a reminder 415 that is automatically generated and displayed by the module 130 based on applying a cognitively determined rule to the new message 402 as described herein.

Figure 5:
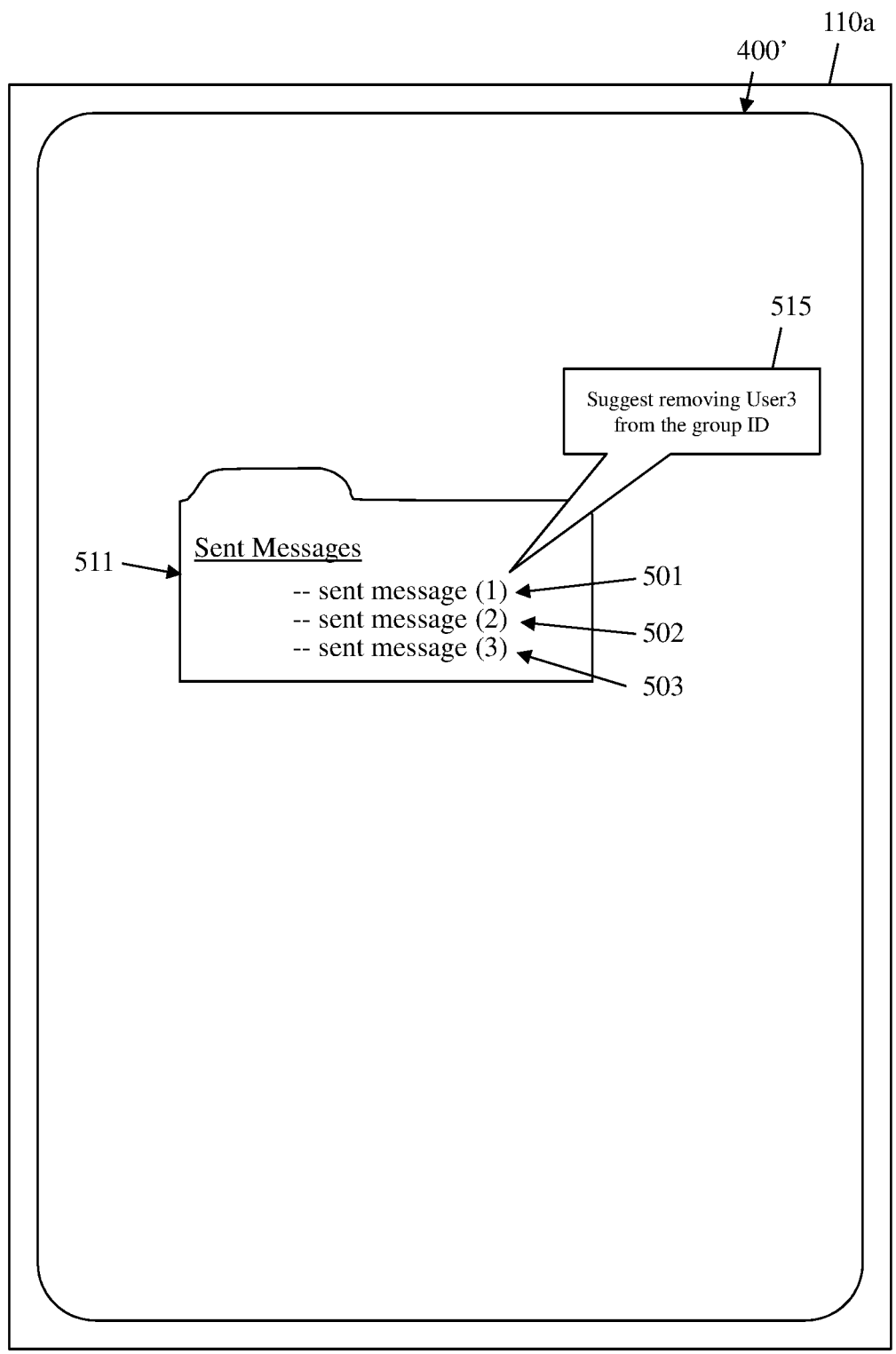
FIG. 5 shows an exemplary user interface in accordance with aspects of the invention.

FIG. 5 shows an exemplary implementation of aspects of the invention. In particular, FIG. 5 shows the user interface 400' displaying sent messages 501-503 in a Sent Messages folder 511. In the example shown in FIG. 5, the module 130 automatically generates and displays a notification 515 to the sender of a new message suggesting that a particular user (e.g., User3) be deleted from the email group ID to which the new message was sent.

As will be understood from the description provided herein, implementations of the invention provide a method for gaining insights about emails in a shared-group email system (e.g., an individual company or organization) using crowd-sourcing, the method comprising: analyzing how different individuals within the group each respond (e.g., delete without reading, reply within a day, etc.) to a particular mass email (e.g., a spam email, an email from a supervisor); identifying, based on the analysis, patterns (e.g., trends) in the responses; and based on the identified patterns, automatically performing (or automatically recommending that the user perform) a particular response to the email for a particular individual who has not yet had time to review the email. In embodiments, the automatic action performed takes into account the individual's rank or position in the group relative to the others who have already responded to the email.

As will be understood from the description provided herein, implementations of the invention provide a method for gaining insights about emails in a shared-group email system (e.g., an individual company or organization) using crowd-sourcing, the method comprising: analyzing how different individuals within the group are communicating about a particular topic in emails to which a particular individual is not a party; and responsive to the particular individual receiving an email, detecting that it is relevant to the particular topic and recommending a particular response to the email based on the both (i) the content of the particular email and (ii) the communications of the other members of the group about the particular topic, wherein the recommendation is provided in such a manner that it protects the privacy of the other members of the group by not providing the particular individual with details about those communications to which the particular individual was not a party.

As will be understood from the description provided herein, implementations of the invention provide a system configured to perform big-data analytics on multiple email messages across the organization for interesting insights. The system is configured to provide automatic rule generation based on insights derived, such as automatic management of group members based on member response to group emails, auto reminders and alerts for task completion for individual employees, etc. The system introduces "Personal Assistant" features in email applications, e.g., by automatically prioritize the tasks for productive outcome from the employees.

As will be understood from the description provided herein, implementations of the invention provide a system configured to identify a set of use cases for cognitive analytics, wherein multiple such use cases can be implemented simultaneously and can be configured with an appropriate priority of execution. An exemplary use case involves determining how corporate communications are embraced by the employees and enablers to make it more effective. In a first step, the system calculates across the organization how soon the corporate communication notification email is read. The system may be configured to account for time zone differences in the logic. In a second step, the system classifies the information based on different factors such as geography, employee role, etc. In a third step, the system identifies which group of people are interested in the communication by detecting at how soon the email was read, how much time was spent on the contents, and how soon any subsequent actions were performed. The actions may include, for example, opening a web-link to read more on the quarterly results or open a link to complete a mandatory certification. In embodiments, the system uses segmentation of the data, combined with the actions and results, to narrow down a group of people the communication is effective with and another group of people with which the communication is not effective. In a fourth step, the system analyzes what kinds of emails are generally interesting for the second group, i.e., the least interested group. For example, the cognitive analysis could find that employees in a particular role in the enterprise prefer shorter version of emails in general compared to multiple paragraphs. In a fifth step, based on the outcome, the system customizes the corporate communication to appeal to each group with their preference method.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

determining, by a computer device, classifications of plural messages sent amongst plural users, the classifications including some of the plural messages classified as informational messages that do not require follow-on action and others of the plural messages classified as action-oriented messages that require follow-on action;

detecting, by the computer device, actions performed by the plural users in response to receiving ones of the plural messages;

determining, by the computer device, insights that different classifications of ones of the plural messages are handled by different follow-on actions based on the determined classifications and the detected actions;

automatically generating, by the computer device, at least one new rule based on at least one of the insights; and automatically applying, by the computer device, the at least one new rule to new messages sent amongst the plural users.

2. The method of claim 1, wherein the at least one new rule comprises a rule to automatically move the new message to a particular folder in a recipient's user interface.

3. The method of claim 1, wherein the at least one new rule comprises a rule to automatically create a reminder, about the new message, in a recipient's user interface.

4. The method of claim 1, wherein the at least one new rule comprises a rule to automatically generate and present a recommendation to a sender of the new message to modify a group ID to which the new message was sent.

5. The method of claim 1, further comprising storing and applying at least one predefined baseline rule that is different from the at least one new rule.

6. The method of claim 1, wherein:

the plural messages comprise plural emails; and the computer device comprises a mail server.

7. The method of claim 6, wherein the detected actions are selected from the group consisting of: replying to all recipients and a sender of an email; opening a link in an email; saving an email in a file directory; moving an email to another folder; creating a reminder that includes information from an email;

and creating a task that includes information from an email.

8. The method of claim 6, wherein the determined classifications are based on cognitively determined tone of an email.

9. A computer program product, the computer program product comprising a computer readable storage medium having program instructions embodied therewith, the program instructions executable by a mail server to cause the mail server to:

determine classifications of plural email messages sent amongst a group of users;

detect actions performed by plural users in the group of users in response to receiving ones of the plural email messages;

determine insights that different classifications of ones of the plural messages are handled by different follow-on actions based on the determined classifications and the detected actions of the plural users in the group of users;

automatically generate at least one new rule based on at least one of the insights; and automatically apply the at least one new rule to new email messages sent amongst the group of users.

10. The computer program product of claim 9, wherein the at least one new rule comprises a rule to automatically move the new message to a particular folder in a recipient's user interface.

11. The computer program product of claim 9, wherein the at least one new rule comprises a rule to automatically create a reminder, about the new message, in a recipient's user interface.

12. The computer program product of claim 9, wherein the at least one new rule comprises a rule to automatically generate and present a recommendation to a sender of the new message to modify a group ID to which the new message was sent.

13. The computer program product of claim 9, wherein the program instructions cause the mail server to store and apply at least one predefined baseline rule that is different from the at least one new rule.

14. The computer program product of claim 9, wherein the detected actions are selected from the group consisting of: replying to all recipients and a sender of an email; opening a link in an email; saving an email in a file directory; moving an email to another folder; creating a reminder that includes information from an email; and creating a task that includes information from an email.

15. The computer program product of claim 9, wherein the determined classifications are based on cognitively determined tone of an email.

16. A system, comprising:
a messaging server comprising a processor, a computer readable memory, and a computer readable storage medium; and
program instructions stored on the computer readable storage medium, the program instructions being executable by the processor to:
determine classifications of plural messages sent amongst a group of users;
detect actions performed by plural users in the group of users in response to receiving ones of the plural messages;
determine insights that different classifications of ones of the plural messages are handled by different follow-on actions based on the determined classifications and the detected actions of the plural users in the group of users;
automatically generate rules based on the insights;
determine a classification of a new message sent amongst the group of users;
determine one of the rules applies to the new message based on the determined classification of the new message; and
automatically apply the determined one of the rules to the new message sent amongst the group of users.

17. The system of claim 16, wherein the at least one new rule comprises a rule to automatically generate and present a recommendation to a sender of the new message to modify a group ID to which the new message was sent.

18. The system of claim 16, wherein the program instructions are executable to store and apply at least one predefined baseline rule that is different from the at least one new rule.

19. The system of claim 16, wherein:
the insights are determined based on crowd-sourcing the detected actions of the plural users in the group of users, the detected actions including responses by different users of the plural users to a mass message sent to the different users; and
the automatically generate rules based on the insights further comprises:
identify patterns in the responses by the different users to the mass message; and
automatically send a response to the mass message based on the identified patterns for a user of the plural users who has not opened the mass message sent to the user.

20. The system of claim 19, wherein:
for each message of the plural messages sent amongst the group of users, the system detects an amount of time that elapses between when the message is received and when a recipient user of the group of users performs one of the detected actions on the message; and
the insights are additionally determined based on the detected amounts of time for the plural messages.

* * * * *